A. W. RINFRET.
PATTERN AND METHOD OF CUTTING SKINS OR THE LIKE.
APPLICATION FILED MAY 23, 1919.

1,331,527.

Patented Feb. 24, 1920.

Inventor
Alfred William Rinfret
By
Attorney.

UNITED STATES PATENT OFFICE.

ALFRED WILLIAM RINFRET, OF MONTREAL, QUEBEC, CANADA.

PATTERN AND METHOD OF CUTTING SKINS OR THE LIKE.

1,331,527.  Specification of Letters Patent.  Patented Feb. 24, 1920.

Application filed May 23, 1919. Serial No. 299,280.

*To all whom it may concern:*

Be it known that I, ALFRED WILLIAM RINFRET, residing at 590 Ste. Catherine street, Ouest, in the city of Montreal, in the Province of Quebec, in the Dominion of Canada, have invented certain new and useful Improvements in Patterns and Methods of Cutting Skins or the like; and I do hereby declare that the following is a full, clear, and exact description of the same.

The present invention relates to improvements in the method of cutting skins and the like in the manufacture of fur coats, linings, etc., and a pattern therefor: and the main object of the invention is to eliminate in the "building up" of each skin, four or more of the seams, thus strengthening the skin so much, and at the same time saving time and labor.

A further object is to use the best part of the skin, *i. e.*, the head, and leave the coarser part which is called the rump.

Another object of the invention is to provide a standard pattern that may be used in trimming the skin, to save time in this operation and have skins cut of uniform size.

Another object is to lighten the skin by eliminating a number of seams and at the same time render the same more flexible.

The invention will be better understood with the aid of the accompanying drawings in which.

Like numerals of reference indicate corresponding parts in each figure.

Figure 1:
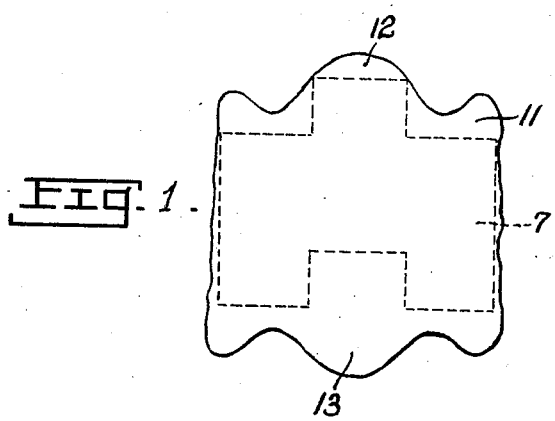
Figure 1 is a plan view of a skin with a diagrammatic outline (in dotted lines) of the improved method of cutting the skin.
Figure 2:
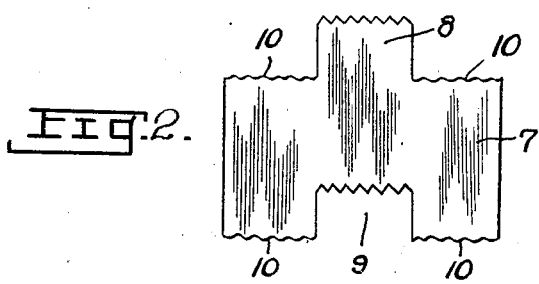
Fig. 2 is a plan view of the pattern used in cutting the skins.

In carrying out the improved method, I provide a pattern 7 of rectangular shape, to fit a standard size skin, having on one side an outwardly projecting portion 8, while the opposite side has a recess or depression 9, in alinement and exactly corresponding in size and shape with said projecting portion 8.

The edges of the projecting portion 8 and the recess 9 are indented and the edges 10 of the pattern on each side of said portion 8 and recess 9 are likewise indented, the latter indentations, however, being more rounded than the ones first mentioned.

The pattern 7 is placed on the skin 11, (see Fig. 1) the projecting portion 8 being preferably made to include a considerable part of the head 12 of the skin. The recess 9 will naturally exclude a considerable part of the rump 13 which is not particularly suitable on account of its coarseness. The skin is then cut according to the pattern.

Figure 3:
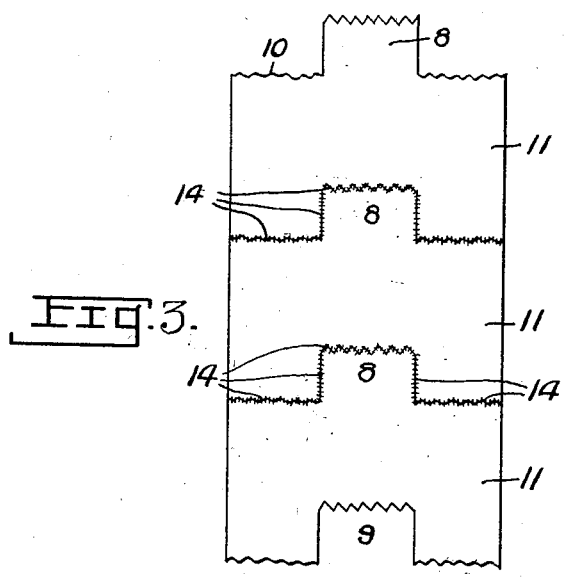
Fig. 3 is a view illustrating a number of skins cut and sewed according to the improved method.

In Fig. 3, is illustrated a number of skins which have been cut according to this new method and sewed together at 14 to produce a continuous strip of fur of constant width but indefinite length. It will be noted that the projecting portion 8 fits snugly into the recess of the adjacent skin, while the mating indentations of the adjacent edges of the skins will interfit, thereby centering the skins with relation to each other and forming perfect and more rational seams than the old method. Further this seam will be particularly strong, and a marked improvement on the old seam, on account of this interlocking feature.

Particular attention must be paid to the recess 9 formed in the skin which avoids the rump which is not suitable in the manufacture of first class garments, as well as to the portion 8, which by its particular position in the skin, naturally reaches the head, which is considered the best part of a skin.

The shape, disclosed in the drawings, of the pattern for cutting the skin, is considered as most advantageous because only the coarse or rough portion of the skin will be left out.

What I claim as my invention is:

1. The herein-described method of cutting fur-bearing skins for joining purposes, consisting in cutting from the skin a substantially-rectangular, one-piece strip having at one of its longitudinal edges a central, outwardly-projecting portion which includes a considerable part of the head of the skin, and having at the other longitudinal edge a central recess which extends inwardly of the strip so as to exclude a considerable part of the rump of the skin and which has precisely the same size and shape as the projecting portion, whereby when a plurality of such strips of the same width are laid together in a row one in advance of another with their adjacent longitudinal edges in immediate contact, to form a continuous strip of constant width but indefinite length, the projecting portion of each skin will exactly fit in the recess in the skin just in front of it and thereby center the strips with relation to one another, and the flank portions of the successive skins will be disposed in longitudinal alinement and will form immediate continuations of one another.

2. The herein-described method of cutting fur-bearing skins for joining purposes, consisting in cutting from the skin a substantially-rectangular, one-piece strip having at one of its longitudinal edges a central, outwardly-projecting portion which includes a considerable part of the head of the skin, and having at the other longitudinal edge a central recess which extends inwardly of the strip so as to exclude a considerable part of the rump of the skin and which has precisely the same size and shape as the projecting portion; the front edge of said projecting portion, the inner edge of said recess and the two longitudinal edges of the skin all being parallel and formed with mating indentations, whereby when a plurality of such strips of the same width are laid together in a row one in advance of another with their adjacent longitudinal edges in immediate contact, to form a continuous strip of uniform width but indefinite length, the projecting portion of each strip will exactly fit in the recess in the skin just in front of it and the mating indentations on adjacent edges will interfit, thereby centering the strips with relation to one another, and the flank portions of the successive skins will be disposed in longitudinal alinement and will form immediate continuations of one another.

3. The herein-described new article of manufacture, comprising a standard-sized strip of fur-bearing skin of substantially rectangular shape, having at one of its longitudinal edges a central, outwardly-projecting portion which includes a considerable part of the head of the skin, and having at the other longitudinal edge a central recess which extends outwardly of the strip so as to exclude a considerable part of the rump of the skin and which has precisely the same size and shape as the projecting portion.

4. The herein-described new article of manufacture, comprising a standard-sized strip of fur-bearing skin of substantially rectangular shape, having at one of its longitudinal edges a central, outwardly-projecting portion which includes a considerable part of the head of the skin, and having at the other longitudinal edge a central recess which extends inwardly of the strip so as to exclude a considerable part of the rump of the skin and which has precisely the same size and shape as the projecting portion; the front edge of said projecting portion, the inner edge of said recess and the two longitudinal edges of the skin all being parallel and formed with mating indentations.

Signed at Montreal, Quebec, Canada this 12th day of May 1919.

ALFRED WILLIAM RINFRET.

Witnesses:
C. PATENAUDE,
A. DES ROSIERS.